Sept. 4, 1928.

F. E. FRICK 1,682,900

HOT TOOL ROTARY CUTTER

Filed Feb. 5, 1926

INVENTOR
F.E.Frick
BY
F. Ledermann
ATTORNEY

Patented Sept. 4, 1928.

1,682,900

UNITED STATES PATENT OFFICE.

FRANK E. FRICK, OF FLUSHING, NEW YORK.

HOT-TOOL ROTARY CUTTER.

Application filed February 5, 1926. Serial No. 86,304.

The main object of this invention is to provide a cutter for the sharpening of masons' chisels. Chisels used in the mason's art frequently require replacement, owing to the fact that they quickly become dulled when coming in contact with such stone as granite or the like. These tools previously have been sharpened by heating in a forge with the aid of a knife, hammer, or wedge. When sharpening chisels in this manner, it requires a relatively long length of time and the product is accomplished with degree of precision. This invention provides a cutter mounted upon a spindle and the chisel is resharpened after being heated by being placed in contact with the periphery of the wheel.

The above and other objects will become apparent in the description below, in which characters of reference refer to like-named parts in the drawing.

Referring briefly to the drawing, Figure 1 is a front elevational view of the rotary tool cutter.

Figure 1:
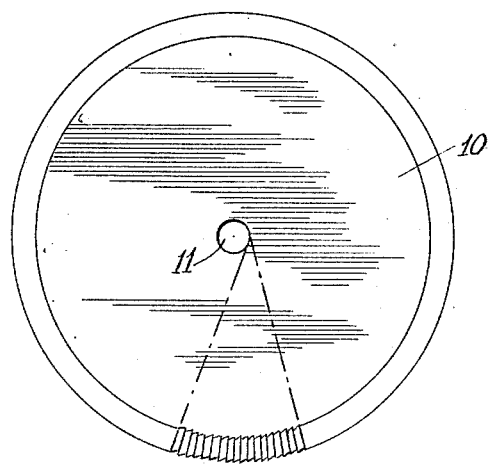
Figure 2:
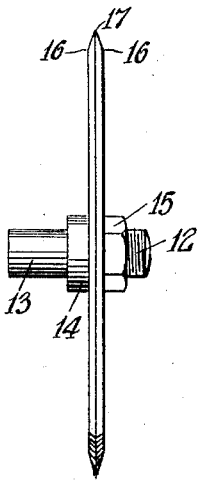
Figure 2 is a side elevational view of the same.

Referring in detail to the drawing, the numeral 10 indicates an annular flat disk composed of tool steel or some other similar material. This disk has an axial hole 11 formed therein which is adapted to be slipped upon a threaded mandrel 12 whose shank 13 is secured in the chuck of a lathe or the like. The shank 13 has a flange 14 formed thereon upon which one face of the disk 10 seats. The mandrel 12 extends from the flange 14 and a nut 15 threadably engaging the mandrel secures the disk 10 in place on said mandrel. The periphery of the disk 10 has bevelled surfaces 16 extending from its both faces toward a point 17. A plurality of teeth 18 are formed on its bevelled surfaces 16. These teeth extend the entire length of the bevelled surfaces and the cutting edges 19 extend parallel to the tangent of the hole 11 formed in the axis of the disk 10. The clearance between each tooth is formed by making the faces of the teeth inclined so that these inclined surfaces provide a clearance 20 between the cutting edge 19 of one tooth and the cutting edge of the next adjacent tooth.

Figure 3:
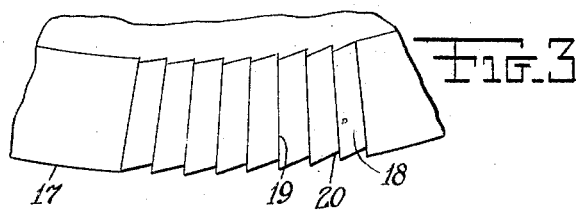
Figure 3 is an enlarged fregmentary view of a portion of the rotary tool cutter, showing a detailed construction of the teeth.
Figure 4:
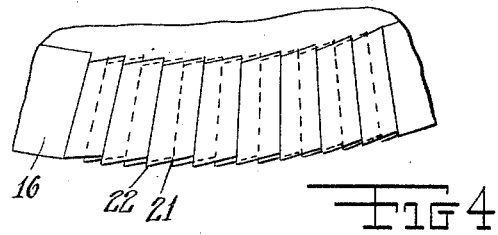
Figure 4 is a view similar to Figure 3, showing the modified type of teeth applied to the rotary tool cutter.

Figure 4 shows a modified type of cutting tooth. The disk and its bevelled surfaces 16 are provided as in the preferred form. One of the bevelled surfaces 16 in the modified form has teeth cut on it similar in all respects to those shown in Figure 3, and on the opposite bevelled face, identical teeth are formed which are off-set so that the cutting edge 21 of the teeth on the off side occur midway between the cutting edge 22 and the base of the same tooth.

Figure 5:
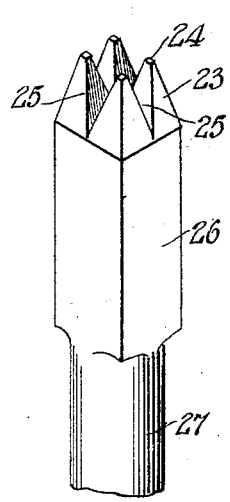
Figure 5 is a perspective view of a mason's chisel, showing the prongs sharpened by the rotary cutter.
Figure 6:
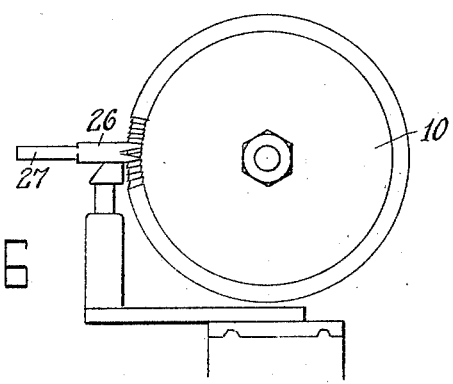
Figure 6 is an elevational view, showing the application of the chisel to the rotary tool cutter.

Figure 5 illustrates a conventional type of stone mason's chisel. These chisels are almost always provided with prongs 23 which taper to a sharp or tool point 24 and are separated by V grooves 25. The chisels are provided with a body 26, square in cross section, and a round shank 27 which is adapted to be fitted to an air gun. These prongs, when the chisel is being used, quickly become worn, bent, or otherwise deformed so that their cutting edges are not sharp enough to be useful for the purpose. Heretofore, these prongs were formed manually on a forge with the aid of a cleavage chisel. In following this method of sharpening a chisel, it was found that no two chisels were alike. The prongs would be bent and shifted and a large amount of work was necessary to form perfect prongs upon a chisel. With this rotary cutter, the prongs of a chisel are formed peripherially, one chisel like the other and in a fraction of time that was heretofore required. The disk cutter is mounted on a mandrel 12 which is secured in the chuck of a lathe and the tool or chisel which has been placed in the fire until a cherry red heat is had, is brought into contact with the teeth 19 of the rotary disk. The periphery or cutting edge 17 of the disk is inserted into the space 24 existing between the prongs of the chisel and the position of the chisel is changed by urging said chisel toward the rotary cutting disk so that a new V-shaped groove is formed between the prongs, as illustrated in Figure 6. In Figure 4, the modified type of cutting teeth are provided, showing the teeth of one of the bevelled surfaces 16 being off-set from the teeth formed on the adjacent bevelled surface. Teeth fashioned in this manner provide a cutter which has longer wearing power than that shown in Figure 3.

I claim:—

A hot tool rotary cutter comprising an annular disk having converging bevelled surfaces, teeth formed on said bevelled surfaces, the cutting edges of said teeth extending tangentially to the axis of the disk, the cutting edge of the teeth on one of the bevelled surfaces being off-set from the cutting edge of the teeth on the opposite bevelled surfaces.

In testimony whereof I affix my signature.

FRANK E. FRICK.